United States Patent
Wood et al.

(10) Patent No.: US 7,089,092 B1
(45) Date of Patent: Aug. 8, 2006

(54) AIRBORNE SYSTEM AND METHOD FOR IMPROVING THE INTEGRITY OF ELECTRONIC LANDING AIDS

(75) Inventors: Robert B. Wood, Beaverton, OR (US); Kenneth A. Zimmerman, Portland, OR (US); Carlo L. Tiana, Portland, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 594 days.

(21) Appl. No.: 10/198,541

(22) Filed: Jul. 18, 2002

(51) Int. Cl.
*G06F 19/00* (2006.01)
*G06F 7/00* (2006.01)

(52) U.S. Cl. .............................. 701/14; 701/16; 701/4; 703/13; 342/33

(58) Field of Classification Search .................. 701/14, 701/16–18, 4, 3, 1, 9, 8, 207, 213, 214, 13; 342/33, 63; 340/948, 951; 348/113, 117; 244/183; 173/178 T; 703/13
See application file for complete search history.

(56) References Cited

U.S. PATENT DOCUMENTS

| | | | | |
|---|---|---|---|---|
| 6,157,876 A | * | 12/2000 | Tarleton et al. | 701/16 |
| 6,492,934 B1 | * | 12/2002 | Hwang et al. | 342/33 |
| 6,571,155 B1 | * | 5/2003 | Carriker et al. | 701/3 |
| 6,591,171 B1 | * | 7/2003 | Ammar et al. | 701/16 |
| 2002/0099528 A1 | * | 7/2002 | Hett | 703/13 |
| 2003/0225487 A1 | * | 12/2003 | Robert et al. | 701/4 |

* cited by examiner

*Primary Examiner*—Jack Keith
*Assistant Examiner*—Ronnie Mancho
(74) *Attorney, Agent, or Firm*—Nathan O. Jensen; Kyle Eppele

(57) ABSTRACT

A method of increasing positional awareness of a pilot of an aircraft during a landing approach of the aircraft. First data from a navigational aid is received. The first data is analyzed to determine a first position of the aircraft at a predetermined time. Second data is received. The second data is independent of the first data. The second data is analyzed to determine a second position of the aircraft at the predetermined time. The first position of the aircraft and the second position of the aircraft are compared, and the pilot is alerted to a difference between the first position of the aircraft and the second position of the aircraft. The second data may be displayed in a form that is convenient for the pilot to view during landing.

20 Claims, 6 Drawing Sheets

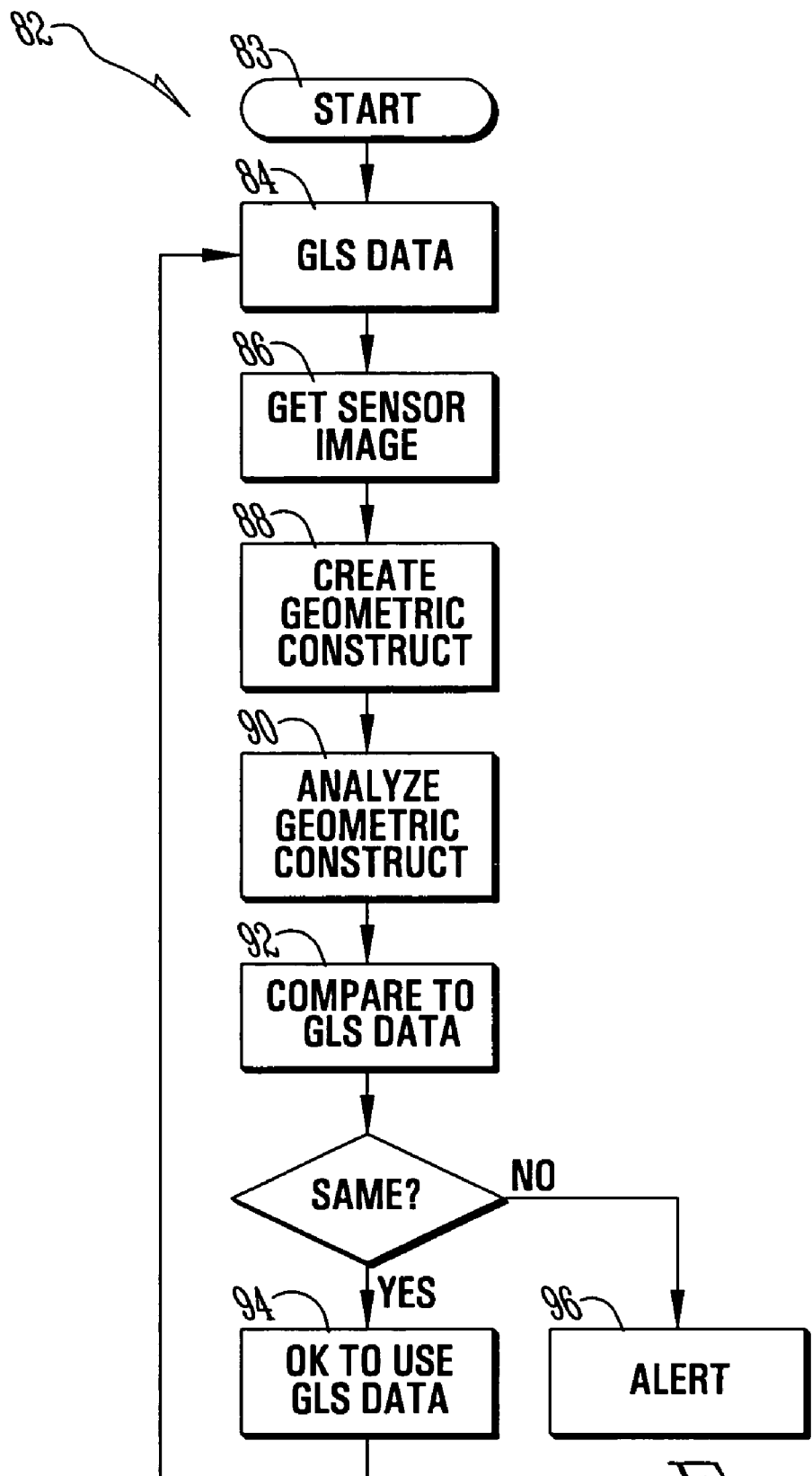

AIRBORNE SYSTEM AND METHOD FOR IMPROVING THE INTEGRITY OF ELECTRONIC LANDING AIDS

FIELD OF THE INVENTION

The invention relates to avionics, and more particularly, to a system that enhances the ability of an aircraft to land using an Instrument Landing System (ILS) or a GPS-based landing system.

BACKGROUND OF THE INVENTION

The process of landing an aircraft on an airport runway requires a good degree of skill as well as knowledge of the aircraft's position with respect to the runway. A pilot must be aware of the aircraft's speed, direction, and angle of descent (known as the glideslope) with respect to the desired touchdown location on the runway. Improper landings may occur if inclement weather or poor visibility, for instance, impedes the pilot's awareness of one or more of these factors.

Because of the possible difficulties that may occur during landing, various systems have been devised to assist the pilot. One such system is known as the Instrument Landing System (ILS), which in its most basic form comprises a VHF localizer signal and a UHF glide slope signal that are transmitted from different positions adjacent the runway. A receiver onboard an airplane receives the signals, and the signals are converted into data usable to determine the position of the airplane with respect to the runway centerline as well as the glide path of the airplane. The ILS signals, which combined may be termed an ILS beam, thereby provide the pilot with critical information that may be used during a landing, even in low-visibility situations.

Many airports cannot afford the equipment necessary to fully implement the ILS system so that it may be used in all weather and visibility categories of approved landing approaches. Some of these airports have deployed a less expensive ILS system that emits a lower-quality beam known as a Type I ILS beam. A Type I ILS beam may be suitable for assisting pilots to land in relatively clear weather, but lacks the integrity necessary to be used in the lowest visibility and weather conditions. Because a Type I ILS beam is unverified, it is possible that the beam may transmit incorrect data, and reliance on the incorrect data in poor visibility may cause an unsafe landing if the pilot cannot otherwise verify the data given to him by the ILS beam. For this reason, a Type I ILS beam may not normally be used to direct a pilot during a CAT II (defined as requiring a runway visual range of >1200 feet and a decision height of 100 feet) or a CAT IIIa (defined as requiring a runway visual range of >700 feet and a decision height of 50 feet) approach. What is needed is some way of increasing the integrity of a Type I ILS beam so that the beam may be used in low visibility conditions such as a CAT IIIa approach.

Global positioning systems, which use a constellation of satellites to provide location coordinates of an object, show significant potential to improve some avionics functions. In the future, some airports may use GPS-based landing aids to provide ILS-like lateral and vertical deviations from a desired approach path. An independent means to verify the GPS-derived path is needed to improve the overall integrity of the system.

It is therefore an object of this invention to provide a system that increases the integrity of a navigational aid such as an ILS beam or a GPS-based landing system.

It is another object of the invention to provide a system that independently verifies data derived from a navigational aid.

One feature of the invention is the use of data from an imaging system to independently verify data from a navigational aid.

Another feature of the invention is the creation of a geometric construct, representing geometries sensed by an imaging sensor, and the derivation of an aircraft's glideslope and position relative to a centerline of an airport runway.

An advantage of the invention is that low-visibility CAT IIIa approaches may be performed at airports having Type I ILS systems.

Another advantage of the invention is that unsafe landings are significantly reduced.

SUMMARY OF THE INVENTION

The invention provides a method of increasing positional awareness of a pilot of an aircraft during a landing approach of the aircraft. According to the method, first data from a navigational aid is received. The first data is analyzed to determine a first position of the aircraft at a predetermined time. Second data is received. The second data is independent of the first data. The second data is analyzed to determine a second position of the aircraft at the predetermined time. The first position of the aircraft and the second position of the aircraft are compared, and the pilot is alerted to a difference between the first position of the aircraft and the second position of the aircraft.

The invention also provides a method of verifying the accuracy of a navigation signal used in a landing operation of an aircraft during a low-visibility approach. According to the method, a navigation signal is received. The navigation signal is analyzed to determine one of a first glideslope and a first position of the aircraft relative to a runway. An image of the runway is obtained from a sensor disposed onboard the aircraft. A geometric construct is derived based upon features of the runway detected in the image of the runway. The geometric construct is analyzed to determine one of a second glideslope of the aircraft and a second position of the aircraft relative to the runway. The method compares one of the first glideslope to the second glideslope, and the first position of the aircraft to the second position of the aircraft. An operator of the aircraft is alerted to a difference between one of the first glideslope and the second glideslope, and the first position of the aircraft and the second position of the aircraft.

The invention further provides a system for assisting an airplane pilot during a landing approach of the airplane. A receiver receives a navigation signal, which is analyzed to determine a first position of the airplane at a predetermined time. An image sensor obtains image of a runway. A processor derives a geometric construct based upon features of the runway detected in the image of the runway. The processor analyzes the geometric construct to determine a second position of the airplane at the predetermined time. A display displays the geometric construct so that the pilot may view the geometric construct during the landing approach. An alerting mechanism alerts the pilot to a difference between the first position of the airplane and the second position of the airplane.

BRIEF DESCRIPTION OF THE DRAWINGS

FIG. 8 is a flowchart that may be used with the embodiment shown in FIG. 7.

DETAILED DESCRIPTION OF THE DRAWINGS

Figure 1:
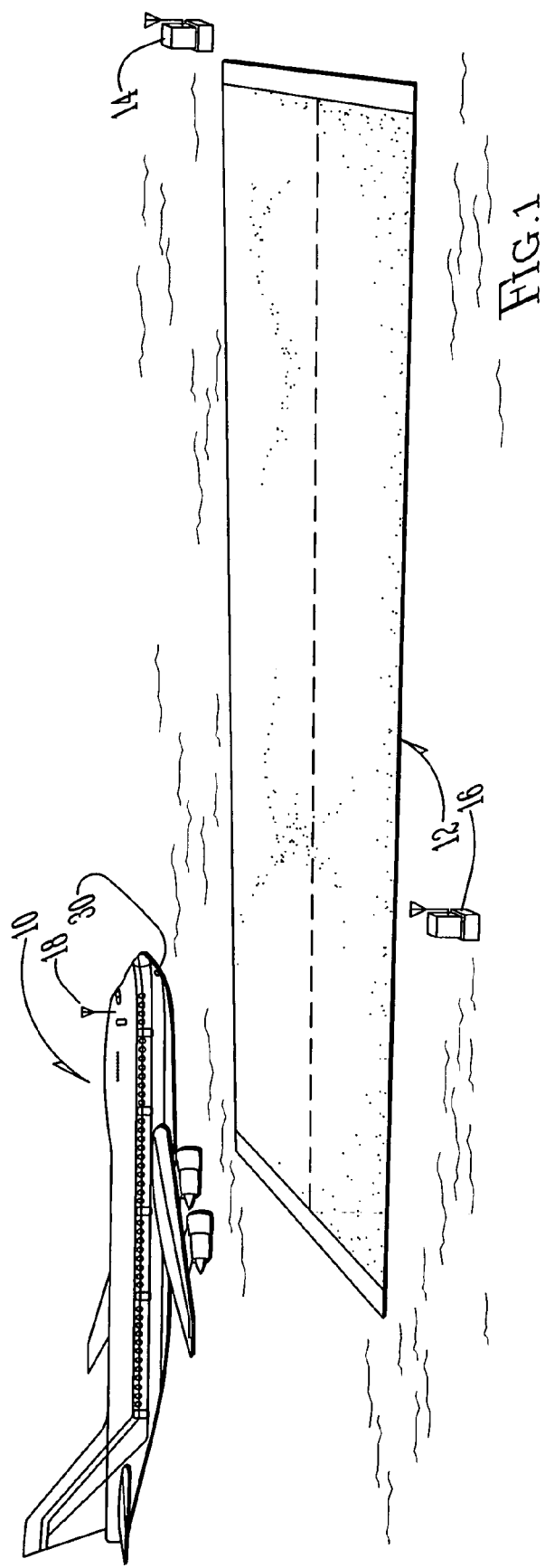
FIG. 1 is a schematic view of an airplane approaching an ILS-equipped runway.
Figure 2:
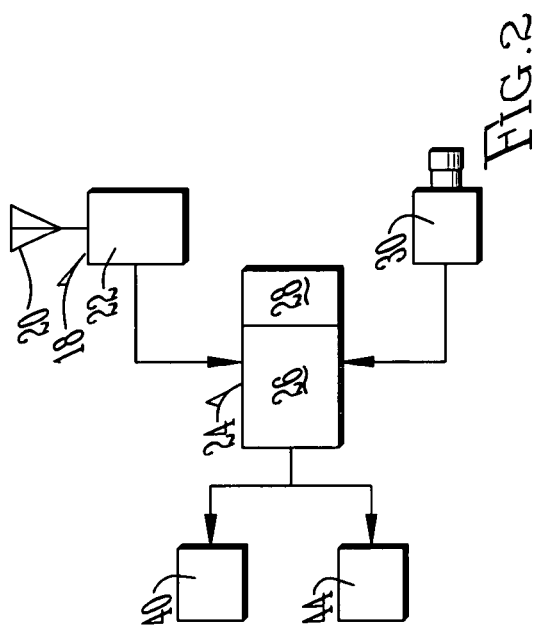
FIG. 2 is a schematic diagram of an aircraft-based enhanced vision imaging system according to the invention.

Turning now to the drawings, in which like reference numbers designate like components, an embodiment of the invention is schematically shown in FIGS. 1–2, in which an airplane 10 is making a landing approach toward a runway 12. A VHF localizer transmitter 14 and a UHF glideslope transmitter 16 are situated adjacent runway 12 at predetermined positions. Together, transmitters 14, 16 comprise an instrument landing system (ILS) and transmit a combination of signals that for convenience will be hereinafter called an ILS beam. A receiver 18 is provided aboard aircraft to detect the ILS beam. As shown in FIG. 2, receiver 18 includes an antenna 20 and a tuner 22, and together the antenna and the tuner detect signals on frequencies upon which transmitters 14, 16 are transmitting. Signals detected by receiver 18 are sent to a flight computer 24, which includes a processor 26 and a memory 28. Processor 26 analyzes the detected signals and determines the position of the runway centerline and the glideslope of aircraft 10 relative to runway 12.

Figure 3:
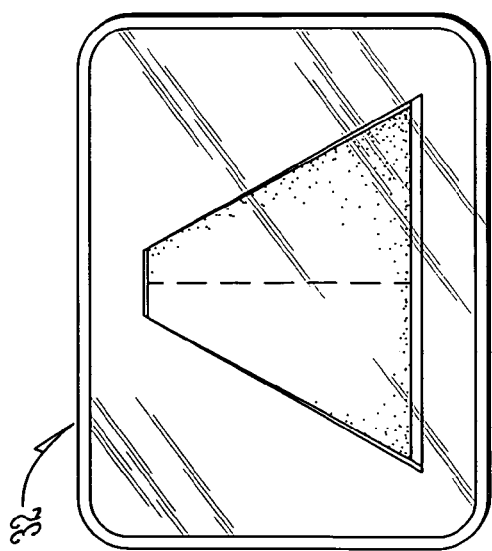
FIG. 3 is an image taken by an airborne image sensor.

The invention also includes an image sensor 30 that is secured to the outside of airplane 10. Image sensor 30 is preferably a camera sensitive to the near infrared (IR) or to visible light. For example, the image sensor may use short-wave IR, mid-wave IR, long-wave IR, or millimeter (mm) wave radar technology. Image sensor 30 is aimed, either permanently or temporarily, to sense images directly ahead of and below airplane 10, and thereby captures an image 32 of runway 12 approached by airplane 10 (FIG. 3). As shown in FIG. 3, image 32 may include an unobstructed view of the entire runway 12, although it is not necessary for the entire runway to appear in image 32. Image 32 may also include all or part of the runway lighting that surrounds runway 12 or otherwise directs aircraft 10 toward the runway.

Figure 4:
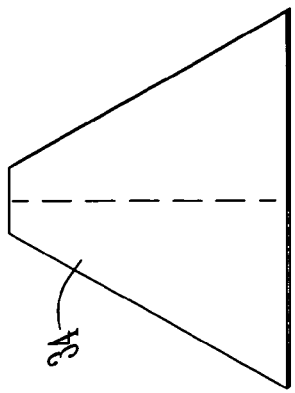
FIG. 4 is a schematic view of a geometric construct derived from the image of FIG. 3.

Image 32 is sent to flight computer 24, where processor 26 creates a geometric construct 34 having shapes and proportions corresponding to the shapes and proportions of image 32. As shown in FIG. 4, geometric construct 34 is a computer-generated, synthetic derivation or representation of image 32 detected by image sensor 30. During a landing approach, geometric construct 34 will be a derivation of the runway and/or the runway lighting as viewed by the airborne image sensor. Depending on the aircraft's position on the runway, geometric construct 34 may include a regular or irregular quadrilateral (or portions thereof whose shape varies depending on the aircraft's position relative to the runway.

Once geometric construct 34 has been created by processor 26, the geometric construct is analyzed to determine the airplane's glideslope and lateral position relative to the runway centerline. Various algorithms and methods may be used to determine the airplane's lateral position and glideslope, such as one or more of the following: comparing the length of one of the sides with a corresponding dimension of the runway, which may also be stored in memory; analyzing the relative length of opposite sides of geometric construct 34; determining if geometric construct 34 is symmetrical along an arbitrary or a predefined centerline; determining the position of some or all of the geometric construct (which would correspond to whether the position of runway 12 as sensed in image 32 is centered); and calculating one or more angles of the geometric construct. In addition, if an image is periodically sensed by image sensor 30 each second, for example, multiple geometric constructs may then be analyzed to determine any time-dependent change of the airplane's position. The details of these or other algorithms that use the geometric construct to determine airplane position are considered to be fully derivable, without undue experimentation, by one having ordinary skill in the art.

Processor 26 compares centerline position (i.e., the position of the aircraft relative to the centerline) and glideslope data derived from image 32 with centerline location and glideslope data derived from the ILS signal. Since the two sets of data are derived independent of each other, agreement of the data with respect to the centerline position and glideslope of the airplane causes processor 26 to conclude that the data, especially the ILS-derived data, is correct, and that the pilot may safely rely on the ILS-derived data to land the airplane. If there is any difference beyond a predetermined threshold between the two independently derived sets of data, it is assumed that one of the sets of data is incorrect. An alert 44 is provided to the pilot to warn of possibly incorrect data. Alert 44 may be visual, aural or tactile, and preferably advises the pilot to abort the current approach. The aircraft is directed to attempt another approach.

Figure 5:
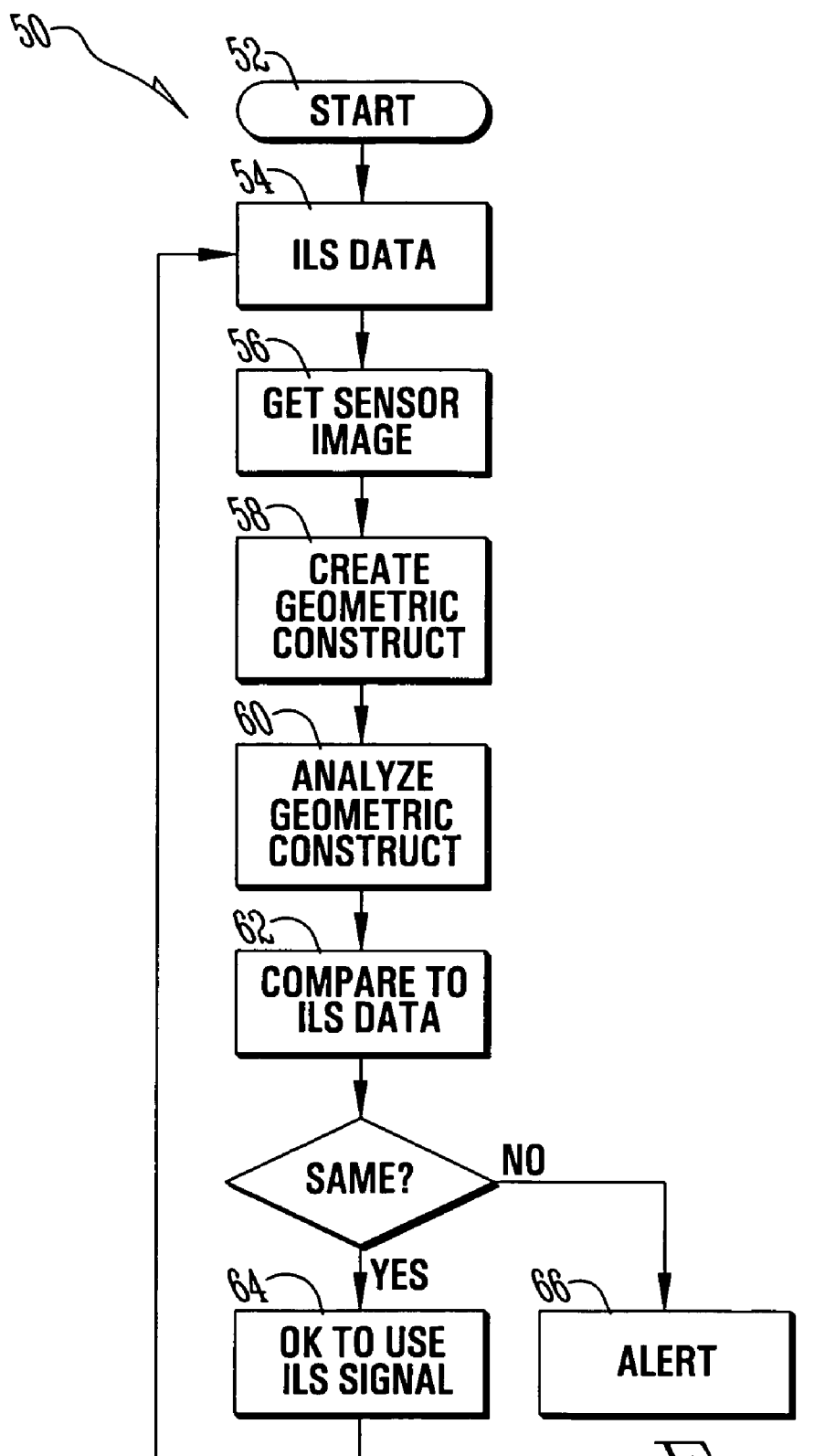
FIG. 5 is a flowchart of an embodiment of the invention.

FIG. 5 is a flowchart showing a method 50 of practicing the invention. For convenience, method 50 will be described with reference to the above description of the invention, although the scope of method may in fact be broader than what has been described. In step 52, the method is initiated either manually by a pilot or automatically by flight computer 24 during a landing approach. In step 54, ILS data is received and processed by flight computer 24 (including processor 26) to determine centerline position and glideslope data. In step 56, image sensor 30 obtains image 32, which during a landing approach should include a view of runway 12 at an airport. In step 58, flight computer 24 (including processor 26) creates a geometric construct derived from image 32. In step 60, the geometric construct is analyzed, using one or more of various algorithms, to determine the centerline location and glideslope of airplane 10 relative to the runway. In step 62, the centerline and glideslope data derived using image sensor 30 are compared to the ILS-derived centerline and glideslope data. If there is no appreciable difference between the two sets of data, then in step 64 it is determined that it is permissible to use the ILS-derived data. However, if there is an appreciable difference between the two sets of data, then in step 66 the pilot is alerted that there is a discrepancy in the data. The pilot may also be instructed not to land using the ILS-derived data.

It is anticipated that in low-visibility landing scenarios not all of runway may be visible to image sensor 30. However, many of the above algorithms are designed to provide accurate aircraft position information even if the image sensor senses only a part of the runway.

Figure 6:
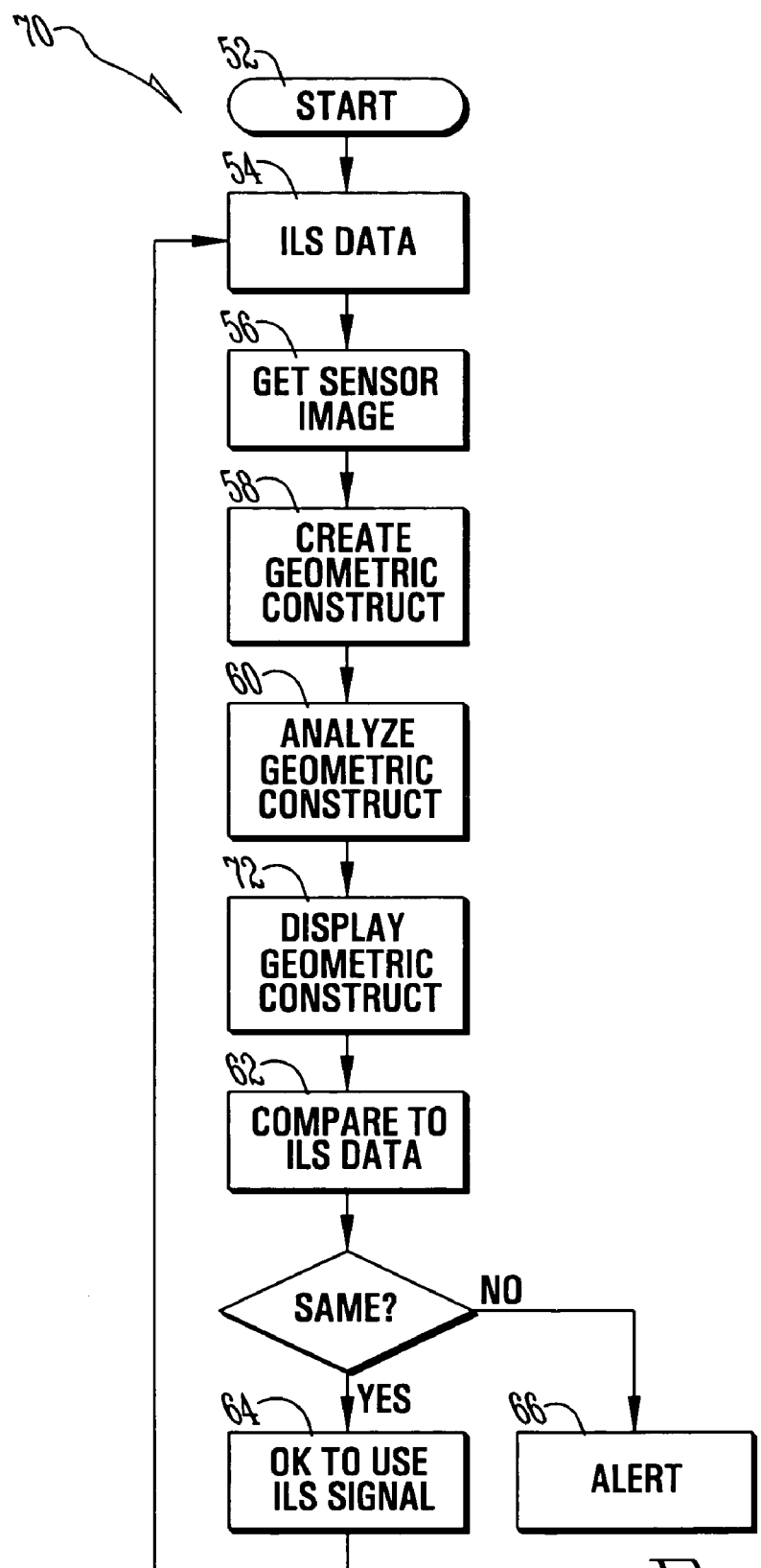
FIG. 6 is a flowchart of another embodiment of the invention.

The invention may advantageously be used to enhance the vision or awareness of a pilot landing in low-visibility conditions. To that end, part or all of the geometric construct may be presented to the pilot on an avionics display, and preferably is overlaid on the pilot's view of the runway using a head-up display (HUD) 40. The pilot would then have the benefit of enhanced awareness of the runway at a time when poor visibility prevents a clear, unaided view of the runway. FIG. 6 shows a method 70 according another embodiment of the invention in which, in step 72, the geometric construct is displayed on a HUD. Method 70 is otherwise substantially the same as method 50, which is depicted in FIG. 5.

Figure 7:
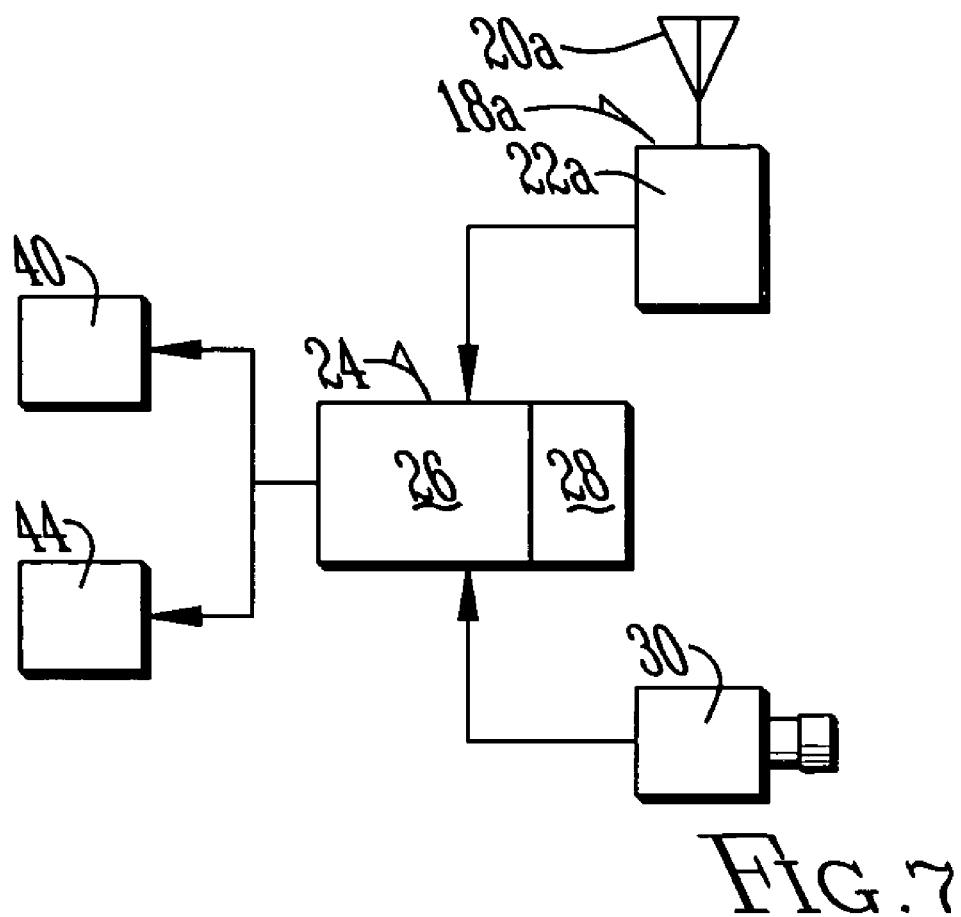
FIG. 7 is a schematic diagram of an aircraft-based enhanced vision imaging system according to another embodiment of the invention.

The invention may be incorporated to verify the accuracy position and attitude data received from other types of precision navigation aids such as global position satellite-based (GPS) navigation aids. FIG. 7 shows a system 80, similar to the system shown in FIG. 2, in which receiver 18 is replaced by a GPS receiver 18*a*. GPS receiver 18*a* includes an antenna 20*a* and a tuner 22*a*, and together antenna 20*a* and tuner 22*a* detect signals on frequencies upon which GPS satellites (not shown) are transmitting. Signals detected by receiver 18*a* are sent to a flight computer 24, which includes a processor 26 and a memory 28. As with previously disclosed embodiments, processor 26 analyzes the detected signals and determines the position of the runway centerline and the glideslope of aircraft 10 relative to runway 12. The remaining components of system 80 are similar to those shown in FIG. 2.

System 80 may be operated according to the method 82 shown in FIG. 8 in flowchart form. For convenience, method 82 will be described with reference to the above description of the invention, although the scope of method may in fact be broader than what has been described. In step 83, the method is initiated either manually by a pilot or automatically by flight computer 24 during a landing approach. In step 84, data from a GPS-based landing system (GLS) is received and processed by flight computer 24 (including processor 26) to determine centerline position and glideslope data. In step 86, image sensor 30 obtains image 32, which during a landing approach should include a view of runway 12 at an airport. In step 88, flight computer 24 (including processor 26) creates a geometric construct derived from image 32. In step 90, the geometric construct is analyzed, using one or more of various algorithms, to determine the centerline location and glideslope of airplane 10 relative to the runway. In step 92, the centerline and glideslope data derived using image sensor 30 are compared to the GLS-derived centerline and glideslope data. If there is no appreciable difference between the two sets of data, then in step 94 it is determined that it is permissible to use the GLS-derived data. However, if there is an appreciable difference between the two sets of data, then in step 96 the pilot is alerted that there is a discrepancy in the data. The pilot may also be instructed not to land using the GLS-derived data. As with other embodiments of the invention, to assist the pilot the geometric construct may be displayed on an avionics display such as HUD 40.

An advantage of the invention is that ILS-derived data is verified by an independently-derived navigation aid, such as an IR imaging sensor or a GLS, either of which may be usable in low-visibility conditions.

Another advantage is that the system allows low-visibility approaches, such as CAT IIIa approaches, to be performed at the many airports that have ILS systems transmitting Type I beams.

Still another advantage is that a pilot may be more confident in ILS or GLS data provided during a landing approach, even if the pilot cannot visually confirm the accuracy of the data.

While the invention has been disclosed in its preferred form, the specific embodiments thereof as disclosed and illustrated herein are not to be considered in a limiting sense as numerous variations are possible. The subject matter of the invention includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the invention of the present disclosure.

What is claimed is:

1. A method of increasing positional awareness of a pilot of an aircraft during a landing approach of the aircraft, comprising:
    receiving first data, said first data being data from a navigational aid;
    analyzing the first data to determine a first position of the aircraft at a predetermined time;
    obtaining second data, said second data being independent of the first data;
    analyzing the second data to determine a second position of the aircraft at the predetermined time;
    comparing the first position of the aircraft to the second position of the aircraft;
    alerting the pilot to a difference between the first position of the aircraft and the second position of the aircraft.

2. The method of claim 1, wherein the second data is obtained by obtaining an image of a runway from a sensor disposed aboard the aircraft, and deriving a geometric construct based upon features of the runway detected in the image of the runway.

3. The method of claim 2, wherein the navigational aid is an Instrument Landing System (ILS).

4. The method of claim 2, wherein the navigational aid is a Global Positioning Satellite-based Landing System (GLS).

5. The method of claim 2, further including displaying the geometric construct on an avionics display.

6. The method of claim 5, wherein an image of the runway is obtained from the sensor a plurality of times, and further including:
    deriving a corresponding plurality of geometric constructs; and
    continuously updating the geometric construct displayed on the avionics display;
    wherein the plurality of geometric constructs are analyzed to determine a time-dependent change of the second position of the aircraft relative to the runway.

7. The method of claim 6, wherein the first data is received and analyzed a plurality of times to determine a time-dependent change of the first position of the aircraft relative to the runway.

8. The method of claim 1, wherein the first and second positions of the aircraft are positions of the aircraft relative to a centerline of the runway.

9. The method of claim 1, wherein the first and second positions of the aircraft are first and second glideslopes of the aircraft toward a touchdown point on the runway.

10. A method of verifying the accuracy of a navigation signal used in a landing operation of an aircraft during a low-visibility approach, comprising;
    receiving the navigation signal;
    analyzing the navigation signal to determine one of a first glideslope and a first position of the aircraft relative to a runway;
    obtaining an image of the runway from a sensor disposed onboard the aircraft;
    deriving a geometric construct based upon features of the runway detected in the image of the runway;
    analyzing the geometric construct to determine one of a second glideslope of the aircraft and a second position of the aircraft relative to the runway;
    comparing one of
        the first glideslope to the second glideslope, and
        the first position of the aircraft to the second position of the aircraft;
    providing a visual augmentation system that augments the operator's visual awareness of the runway;
    displacing the geometric construct of the runway on the visual augmentation system, thereby increasing the operator's visual awareness of the runway; and
    alerting an operator of the aircraft to a difference between one of
        the first glideslope and the second glideslope, and
        the first position of the aircraft and the second position of the aircraft.

11. The method of claim 10, wherein the providing the visual augmentation system comprises providing a head-up display.

12. The method of claim 10, wherein an image of the runway is obtained from the sensor a plurality of times, and further including deriving a corresponding plurality of geometric constructs, and wherein the plurality of geometric constructs are analyzed to determine a time-dependent change of position of the aircraft relative to the runway.

13. The method of claim 10, wherein at least one of the first position of the aircraft and the second position of the aircraft are determined by determining the position of the aircraft relative to a centerline of the runway.

14. The method of claim 10, wherein the image of the runway is obtained using a sensor that is sensitive to infrared light.

15. The method of claim 10, wherein receiving the navigation signal comprises receiving Instrument Landing System (ILS) broadcast data received from a Type I ILS beam.

16. The method of claim 10, wherein the visual augmentation system displays the geometric construct by overlaying the geometric construct upon the operator's view of the runway.

17. A system for assisting an airplane pilot during a landing approach of the airplane, the system comprising:
    a receiver configured to receive a navigation signal, wherein the navigation signal is analyzed to determine a first position of the airplane at a predetermined time;
    an image sensor that obtains image of a runway;
    a processor that derives a geometric construct based upon features of the runway detected in the image of the runway, the processor further configured to analyze the geometric construct to determine a second position of the airplane at the predetermined time;
    a display that displays the geometric construct so that the pilot may view the geometric construct during the landing approach; and
    an alerting mechanism that alerts the pilot to a difference between the first position of the airplane and the second position of the airplane.

18. The system of claim 17, wherein the first and second positions of the airplane are positions of the airplane relative to a centerline of the runway.

19. The system of claim 17, wherein the first and second positions of the airplane are first and second glideslopes of the airplane toward a touchdown point on the runway.

20. The system of claim 17 wherein the navigation signal Is one of an Instrument Landing System (ILS) signal and a Global Positioning Satellite-based Landing System (GLS) signal.

* * * * *